Feb. 3, 1959 — K. H. ANDREN — 2,871,740
INSULATED WIRE STRIPPER
Filed March 7, 1956 — 3 Sheets-Sheet 1

INVENTOR.
Karl H. Andren
BY
Lieber & Lieber
ATTORNEYS.

Feb. 3, 1959  K. H. ANDREN  2,871,740
INSULATED WIRE STRIPPER
Filed March 7, 1956  3 Sheets-Sheet 2
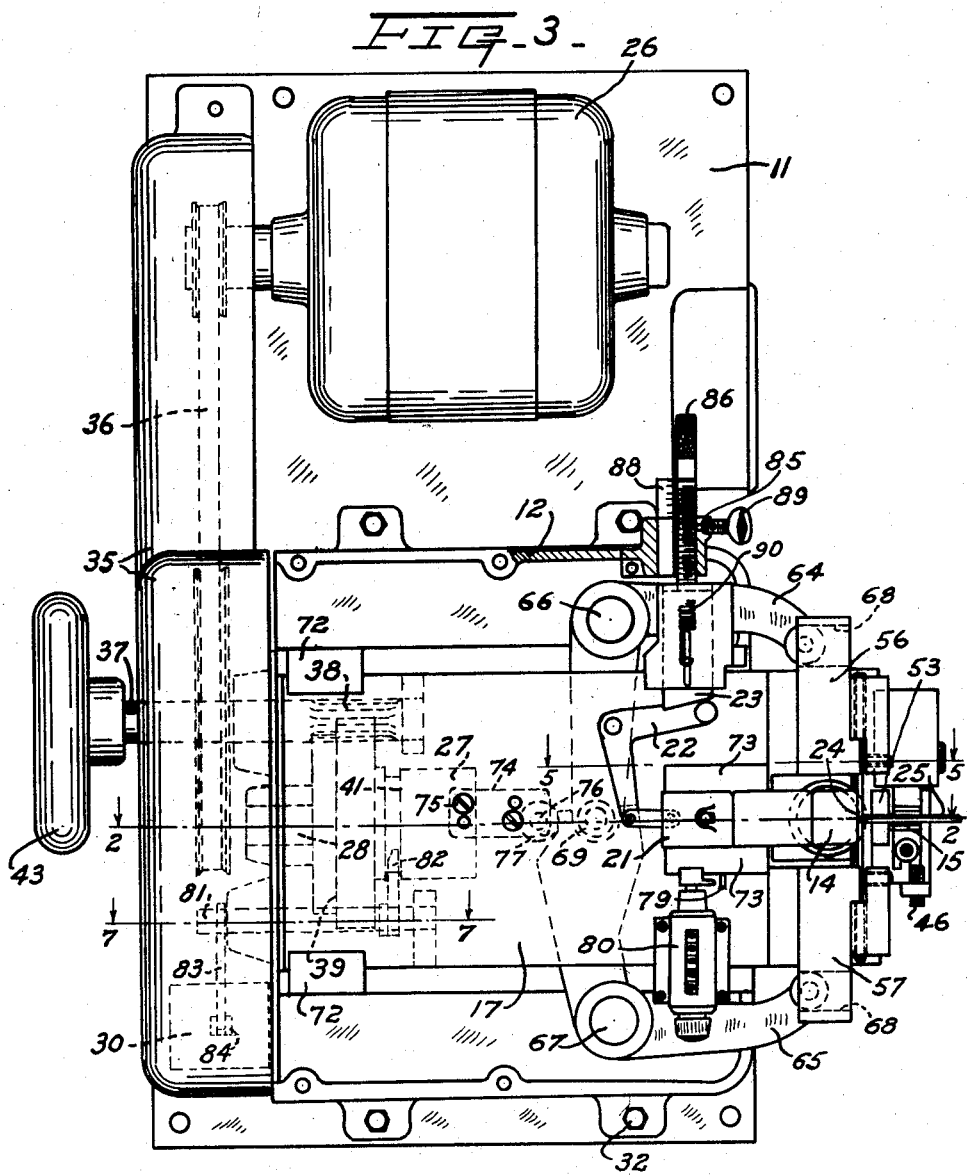
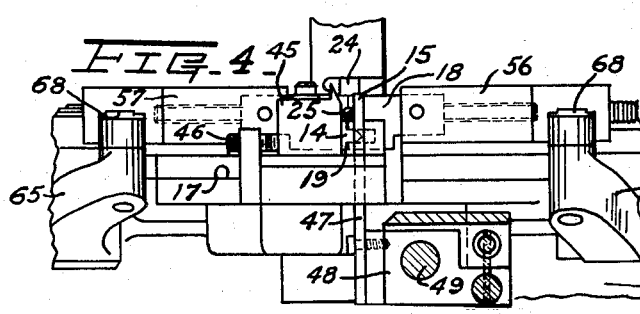
INVENTOR.
Karl H. Andren
BY
Lieber & Lieber
ATTORNEYS.

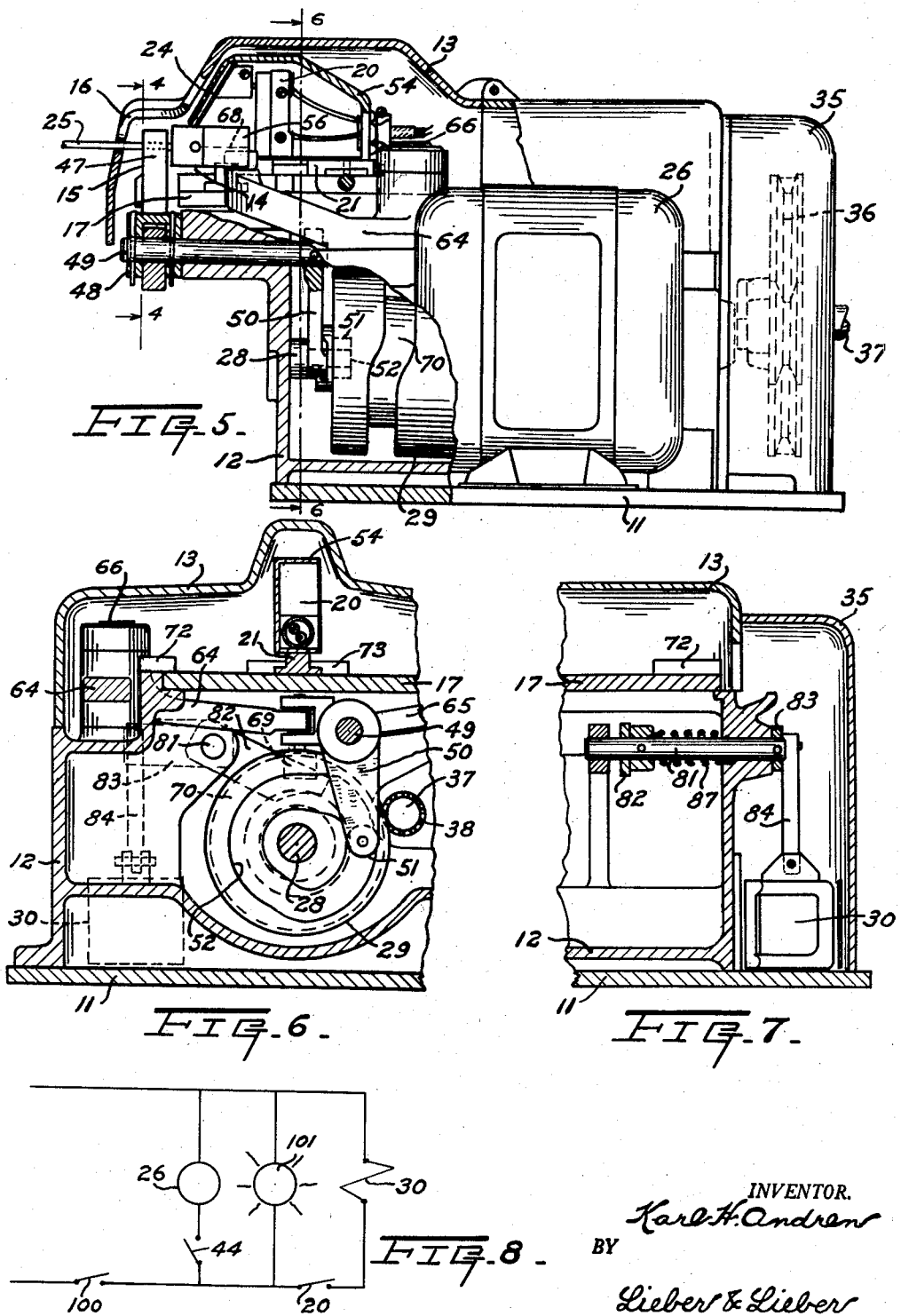

United States Patent Office 2,871,740
Patented Feb. 3, 1959

2,871,740

INSULATED WIRE STRIPPER

Karl H. Andren, West Allis, Wis., assignor to Artos Engineering Company, Milwaukee, Wis., a corporation of Wisconsin Application March 7, 1956, Serial No. 570,135

6 Claims. (Cl. 81—9.51)

This invention relates generally to improvements in the art of producing electrical conductors from insulated wire, and relates more especially to improvements in the construction and operation of manually fed strippers for removing definite lengths of insulation from the ends of successive insulated wires injected into such machines.

The primary object of my invention is to provide an improved insulated wire stripper which is simple and durable in construction and highly effective in operation.

Wire stock which is utilized to produce electrical conductors for certain classes of service such as in aircraft and other transportation units, where utmost safety and dependability are essential, is usually formed of numerous strands covered with durable and tenacious insulation containing fibre glass. Such stock must be cut into various lengths and each severed length must ordinarily have a definite length of the insulation removed from either one or both ends thereof so as to enable the stripped ends to be applied to binding posts or to have terminals attached thereto in a manner whereby most effective conductivity is assured.

While many machines adapted to automatically cut ordinary insulated wire into lengths and to strip the insulation from one or both ends of each section, have heretofore been extensively used, these automatic cutting and stripping devices cannot be utilized to accurately and safely handle wire stock of the type comprising delicate strands embraced by tenacious and hard insulation of glass fibre or the like, without either introducing undesirable variation in the lengths of the removed insulation or severing some of the wire strands. It has therefore been customary in the past, to cut and strip such hard insulation covered wires with the aid of hand tools which were not only tedious and slow to operate but which also endangered the health of the users due to the inhalation of fine flying glass particles.

It is therefore an important more specific object of the present invention to provide an improved insulation stripping unit adapted to rapidly and effectively strip glass fibre or other hard and tenacious insulation from successive wires with utmost precision.

Another important object of this invention is to provide improved insulation stripping mechanism which can be operated conveniently and with utmost safety to the operator to handle products such as glass and other hard insulation covered wires.

A further important object of the invention is to provide a bench type insulation stripper adapted to be fed manually, but in which the insulation severing and stripping operations are performed automatically.

Still another important object of my invention is to provide an improved semi-automatic insulation stripping device which can be easily adjusted to produce clean cut stripping of any desired length, and wherein the removed insulation is effectively eliminated.

An additional important object of the present invention is to provide an improved insulated wire stripping assemblage adapted to effectively operate on wires of various diameters having insulation of diverse thicknesses, and which may be actuated at moderate cost and with maximum safety and least exertion on the part of the operator.

These and other more specific objects and advantages of the invention will be apparent from the following detailed description.

A clear conception of the features constituting the present improvement and of the construction and operation of a typical commercial insulated wire stripper embodying the invention, may be had by referring to the drawings accompanying and forming a part of this specification wherein like reference characters designate the same or similar parts in the various views.

Fig. 3 is a top view of the same unit, with the top cover removed, and with the various parts in the same position as in Fig. 2 wherein the wire has been inserted and clamped while the insulation cutting and stripping tools have been closed preparatory to starting the stripping operation;

Fig. 4 is a fragmentary part sectional front view of the wire clamping mechanism of the insulation cutting and stripping unit, taken along the line 4—4 of Fig. 5;

Fig. 5 is a part sectional side view of the same unit with the timing relation of the parts the same as in Fig. 2, but the section being taken along the line 5—5 of Fig. 3;

Fig. 6 is a fragmentary transverse vertical section through the stripping unit taken along the line 6—6 of Fig. 5;

Fig. 7 is another fragmentary vertical section through the same unit taken along the line 7—7 of Fig. 3;

Fig. 8 is a simple wiring diagram of the electrical control system of the unit.

Figure 2:
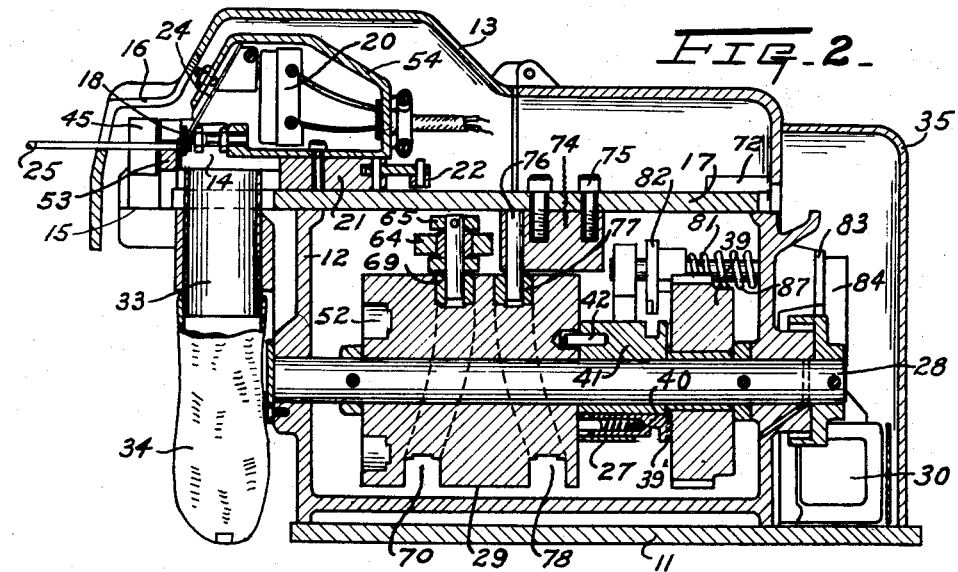
Fig. 2 is a vertical section through the insulation cutting and stripping zone of the unit taken along the line 2—2 of Fig. 3, showing a wire inserted within the insulation cutting and stripping zone and against the tripping switch which has caused the solenoid to actuate the starting clutch and to thereby drivingly connect the stripping mechanism with the motor.

While the invention has been shown and described herein as having been embodied in a bench type electric motor driven insulation cutting and stripping unit, it is not the intent to necessarily restrict the use of the improved features to such an assemblage; and it is also contemplated that specific descriptive terms employed herein be given the broadest interpretation consistent with the actual disclosure.

Referring to the drawing, the improved bench type manually fed and electrically driven stripper shown therein comprises in general, a base plate 11 having a casing 12 mounted thereon and cooperating with a closure cover 13 to provide an enclosed insulation cutting and stripping zone 14; a wire clamp 15 fixedly mounted upon the casing 12 near a wire injection slot 16 in the cover 13; an elongated slide 17 reciprocable upon the casing 12 beneath the zone 14 and carrying a set of insulation cutting and stripping blades 18, 19 located within this zone; a micro-switch 20 carried by a block 21 which is movable along the slide 17 by a bell crank 22 coacting with a normally fixed cam 23, this switch 20 being provided with an actuator 24 cooperable with the end of each successive wire 25 injected into the zone 14; an electric motor 26 mounted on the base plate 11 and being drivingly connectable through a clutch 27 with a shaft 28 journalled in the casing 12 and which carries a rotary cam member 29; a solenoid 30 controllable by the switch 20 to actuate the clutch 27; and mechanism connecting the cam member 29 with the blades 18, 19, clamp 15 and slide 17 for periodically operating these elements.

The main casing 12 and the electric motor 26 may be secured to the base plate 11 in any suitable manner as by bolts 32, and the entire stripping unit may be fastened to a work bench so as to permit convenient insertion of the successive wires 25 and removal of the strippings from the zone 14 through a tube 33 into a bag-like receptacle 34, see Fig. 2. The closure cover 13 is hingedly attached to the casing 12 so as to permit convenient access to the cutting and stripping zone 14 for inspection, adjustment and tool changing purposes; and an auxiliary protective housing 35 for the solenoid 30 and for the endless belt drive 36 through which the motor 26 transmits rotary motion to a counter shaft 37, may also be provided, as shown in Figs. 2, 3 and 5. This counter shaft 37 is journalled for rotation in the main casing 12 and has a pinion 38 at its inner end meshing with a clutch driving gear 39 rotatably mounted on the shaft 28 and which has side teeth 39' cooperable with a driving pin element 40 of the clutch 27 the driven element 41 of which is connected to the cam member 29 by pins 42. The outer end of the counter shaft 37 may be provided with a hand wheel 43 for effecting manual operation and adjustment of the unit before the motor 26 is operated and the mechanism is placed into normal operation by actuation of the motor control switch 44.

The wire holding clamp 15 comprises a normally fixed block 45 which is adjustable toward and away from the path of insertion of the wires 25 by means of set screws 46 as depicted in Fig. 4, and a pivotally supported clamping plate or movable jaw 47 swingable toward and away from the block 45 by means of a carrying element 48 adjustably secured to a pivot shaft 49. This shaft 49 is also journalled to oscillate in the main casing 12 and has its inner end provided with a depending arm 50 the lower swinging end of which carries a roller 51 coacting with an end cam groove 52 formed in the cam member 29, see Figs. 5 and 6. Located directly beyond the clamp 15 is an anvil 53 for guiding the incoming ends of the wires 25 in proper position past the cutting blades 18, 19 and against the micro-switch actuator 24 as in Fig. 2, and this actuator 24 and the switch 20 are additionally protected by an auxiliary guard 54 secured to the block 21.

Figure 9:
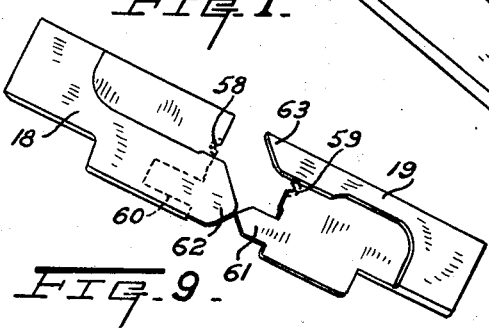
Fig. 9 is an enlarged perspective view of one of the insulation cutting and stripping sets of blades.

The insulation cutting and stripping blades 18, 19 must be very accurately formed as illustrated in Fig. 9, of tool steel or other durable metal, and are detachably secured to oppositely movable tool holders 56, 57 respectively, which can be readily replaced with blades 18, 19 adapted to cooperate with insulated wires 25 of various diameters having insulation of different thickness. The blade 18 is provided with an insulation severing semi-circular notch 58 which is cooperable with a similar sharp notch 59 formed in the blade 19, both of which notches are provided with insulation receiving recesses, and while these notches 58, 59 are capable of producing a clean cut through the insulation they will not cut or otherwise mar a confined wire whether solid or composed of multiple strands. The blade 18 is also provided with a recess 60 with which a tongue 61 formed on the other blade 19 is cooperable, and these blades are moreover provided with cut-away portions with which projections 62, 63 formed on the respective blades are cooperable, so as to most effectively guide these tools and the wire 25 during cutting operations. The tool holders 56, 57 and the blades 18, 19 are simultaneously movable in opposite directions but in a fixed transverse plane by means of bell crank levers 64, 65 swingable about fixed pivots 66, 67 and one arm of each of which carries a roller movable laterally within a groove 68 formed in the adjacent tool holder, while the ends of their other arms are swingably interlocked beneath the slide 17 and are provided with a roller 69 coacting with another cam groove 70 formed in the periphery of the cam member 29.

The slide 17 which carries the switch actuating block 21 and the tool holders 56, 57 is guided for longitudinal reciprocation in the casing 12 by guides 72, and the block 21 is guided for like additional reciprocation but at higher speed by other guideways 73, see Figs. 3 and 6. A block 74 fastened to the medial lower portion of the slide 17 by screws 75 carries a depending pin 76 having a roller 77 mounted thereon, and this roller 77 is cooperable with still another cam groove 78 formed in the cam member 29 as shown in Fig. 2. One of the guides 73 for the upper block 21 may also be provided with a pin 79 adapted to actuate a counter 80 as depicted in Fig. 3, thus providing means for automatically recording the number of wires 25 which have been stripped. The solenoid 30 is controllable by the micro-switch 20 carried by the block 21 and is adapted to actuate the clutch 27 which drives the shaft 28 and the cam 29, by means of an oscillatory clutch actuating arm 82 swingably secured to a counter shaft 81 and which is cooperable with the relatively movable clutch elements 40, 41, to establish a driving connection between the gear 39 and the cam member 29 whenever the solenoid 30 is energized. The shaft 81 is mounted in bearings on the main casing 12 and has another oscillatory arm 83 secured to its outer end and the swinging end of which is pivotally attached to the movable plunger of the solenoid 30 by means of a link 84 as illustrated in Figs. 3 and 7.

Figure 1:
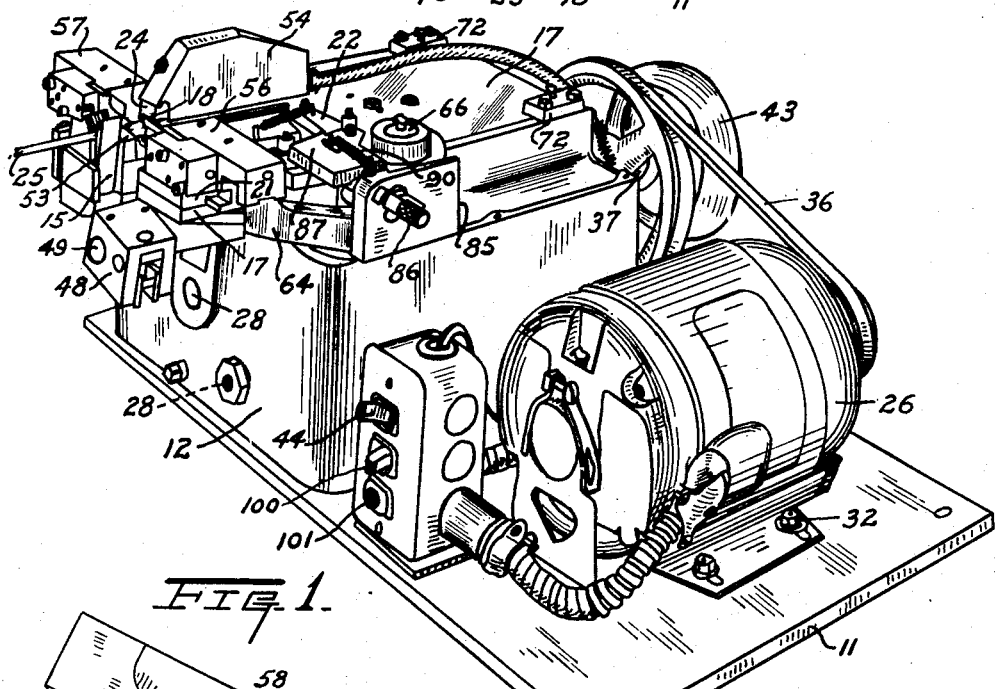
Fig. 1 is a perspective view of one of the improved wire stripping units with the top cover removed and the wire clamp open for the insertion of a wire.

The extent of movement of the block 21 which carries the solenoid control switch 20 and determines the position of the actuator 24, is adjustable by varying the position of the cam 23 which coacts with the bell crank 22, with the aid of an adjusting screw 86 having screw thread cooperation with the casing 12 and which abuts against the end of the cam 23 as shown in Figs. 1 and 3. This screw 86 is cooperable with a gauge 88 to definitely predetermine the length of the insulation which is to be stripped from each wire 25, and is adapted to be locked in adjusted position by means of a clamping screw 89, and a tension spring 90 tends to constantly urge the cam 23 away from the cutting and stripping zone 14 and against the screw 86, in order to eliminate lost motion. The electrical system involved in the unit may also be provided with a main shut-off switch 100 and with a signal light 101 as shown in the wiring diagram of Fig. 8, and may derive its current from any convenient source of power.

When the improved insulation cutting and stripping unit has been properly constructed, assembled and adjusted for the desired performance and the covers 13, 35 have been closed, the switches 44, 100 may be closed to place the mechanism in condition for normal operation. The operator may then insert the blunt end of each successive wire 25 through the cover slot 16 past the open clamp 15 along the positioning anvil 53 and past the separated knife blades 18, 19 and against the switch actuator 24, and as the injected wire is advanced longitudinally through the zone 14 it eventually trips and closes the switch 20 and energizes the solenoid 30 to lower the plunger connection 84 and to elevate the clutch actuating arm 82. This action of the solenoid 30 causes the spring of the clutch 27 to automatically drivingly connect the constantly rotating gear 39 with the shaft 28 and cam member 29 confined within the casing 12.

Rotation of this cam member 29 first causes the cutting and stripping blades 18, 19 to approach each other so as to cut through the insulation at the desired distance form the adjacent end of the inserted wire, and when such cutting has been effected, the clamp 15 promptly closes and positively holds the wire against possible longitudinal displacement. The slide 17 then moves away from the zone 14 while the blades 18, 19 remain in cutting position, thereby moving these blades away from the clamp 15 and stripping the severed insulation from the adjacent wire end and causing the removed insulation to drop from the zone 14 through the tube 33 into the receptacle 34. During the period when the main slide 17 is thus being retracted and stripping is being effected, the block 21 which carries the switch 20 is also being additionally moved away from the clamp 15 and this movement of the block 21 is effected by the bell crank 22 and cam 23 at higher speed than that of the blades 18, 19 in order to remove the actuator 24 out of the way of the insulation being stripped.

As the actuator 24 moves away from the end of the wire 25 the switch 20 automatically opens and de-energizes the solenoid 30 thereby causing the link 84 to rise and the clutch release arm 82 actuated by the spring 87, to drop into the clutch groove and to thereby eventually disconnect the clutch element 40 from the gear 39. However, this release of the clutch 27 does not occur until after the cam member 29 has made a complete revolution and returned the slide 17 to initial wire receiving position and has also separated and returned the blades 18, 19 and released the clamp 15. The operator may then withdraw the end stripped wire 25 from the zone 14 through the cover slot 16, and while the motor 26 and gears 38, 39 will continue to rotate the cam member 29 and the elements driven thereby will remain at rest until another wire 25 is subsequently manually introduced. It is to be noted that before the motor 26 is placed in operation, the operator may utilize the hand wheel 43 to revolve the cam member 29 for trial purposes, and when the unit is operating normally the counter 80 will accurately record the number of wires 25 which have been stripped.

From the foregoing detailed description of the construction and operation of the mechanism, it should be apparent that the present invention in fact provides an insulation cutting and stripping unit adapted to safely and effectively strip hard insulation of any desired length from the ends of successive wires 25, rapidly and with utmost precision. The blades 18, 19 and their holders 56, 57 may be readily removed for the replacement of worn blades or the insertion of different size blades, and these cutting and stripping tools are normally well concealed by the removable cover 13. The length of insulation stripped from each wire end may be accurately varied and predetermined with the aid of the adjusting screw 86 which is accessible from the exterior of the machine.

While the movement of the switch 20 and its actuator 24 away from the clamp 15 at a faster speed than that of the blades 18, 19 is important in order to provide space for free discharge of the strippings, this fast retraction of the switch 20 also serves to avoid possible accidental operation of the switch 20 and solenoid 30 before complete stripping has been effected. The stationary wire clamp 15, the movable jaw or clamping plate 47 of which is preferably formed of spring steel, is capable of positively holding the wires 25 against possible longitudinal displacement while the blades 18, 19 are being moved away from this clamp during stripping operations, and the tube 33 for receiving the strippings should be of sufficient extent to gather all of the removed debris. The clamp 15 also cooperates with the anvil 53 to insure proper location of the injected ends of the wires relative to the blades 18, 19 and to the switch actuator 24, and the improved unit is sufficiently flexible in its adaptations to cooperate with wires of various diameters having tenacious insulation of diverse thickness. The mechanism is also adapted to rapidly and effectively strip successive wires either at one or both ends, and has gone into highly satisfactory and successful commercial operation.

It should be understood that it is not desired to limit this invention to the exact details of construction and operation of the insulation cutting and stripping unit herein shown and described, for various modifications within the scope of the appended claims may occur to persons skilled in the art.

I claim:

1. In a wire insulation stripper, means forming an insulation cutting and stripping zone, cutting blades within said zone for transversely severing the insulation only of a wire inserted endwise into said zone, means for utilizing the extreme inserted end of the wire to definitely locate said blades at any desired cutting position away from said end, and means for retracting said blade positioning means while the insulation severed wire is being withdrawn from said zone to permit the strippings to fall freely away from the zone.

2. In a wire insulation stripper, means forming an insulation cutting and stripping zone, cutting blades within said zone for transversely severing the insulation only of a wire inserted endwise into said zone, a switch for controlling the operation of said blades, an actuator for said switch cooperable with the extreme end of the inserted wire to definitely locate said blades at any desired cutting position away from said end, and means for retracting said switch actuator while the end of the wire is being stripped to prevent the actuator from being contacted by the removed strippings.

3. In a wire insulation stripper, means forming an insulation cutting and stripping zone, a stationary clamp having relatively movable jaws for guiding a wire being inserted endwise into said zone, a pair of blades movable laterally of the wire within said zone and being cooperable to cut and strip the insulation from the inserted wire end, a switch for controlling the cutting operation of said blades, an actuator for said switch coacting with said end of a wire being injected endwise into said zone past said clamp for stopping the wire in proper position relative to the cutting blades, and means for retracting said switch actuator while the wire end is being stripped to permit the stripped insulation to drop freely from said zone.

4. In a wire insulation stripper, means forming an insulation cutting and stripping zone, a stationary clamp having relatively movable jaws for guiding a wire being inserted endwise into said zone, a pair of blades movable laterally of the wire within said zone and being cooperable to cut and strip the insulation from the inserted wire end, a switch for controlling the cutting operation of said blades, an actuator for said switch coacting with said end of a wire being injected endwise into said zone past said clamp for definitely stopping the wire in any pre-selected position relative to the cutting blades, and mechanism operable to retract said switch actuator away from said blades during stripping operation of the latter to permit the stripped insulation to drop freely from within said zone.

5. In a wire insulation stripper, means forming a downwardly open insulation cutting and stripping zone, cooperating insulation cutting and stripping blades movable laterally of the wire within said zone, a movable element cooperable with the end of a wire being injected endwise into said zone for automatically arresting the longitudinal advancement of the wire for proper positioning relative to said blades, means for moving said blades longitudinally of the wire to strip the severed insulation therefrom, and means for moving said element away from said blades during the insulation stripping operation of the latter to permit the stripped insulation to drop freely from within said zone.

6. In a wire insulation stripper, means forming a downwardly open insulation cutting and stripping zone, means for guiding a wire endwise into said zone, cooperating insulation cutting and stripping blades movable laterally of the wire within said zone, a movable element cooperable with the end of a wire being injected endwise into said zone past said conducting means and said blades for automatically arresting the longitudinal advancement of the wire for proper positioning relative to the blades, means for moving said blades longitudinally of the wire to strip the severed insulation therefrom, and means for moving said element away from said zone at a faster rate than the movement of said blades during the insulation stripping operation by the latter to permit the stripped insulation to drop freely from said zone.

References Cited in the file of this patent

UNITED STATES PATENTS

| | | |
|---|---|---|
| 1,666,277 | White | Apr. 17, 1928 |
| 1,784,298 | Mahan | Dec. 9, 1930 |
| 1,902,742 | Wentink | Mar. 21, 1933 |
| 2,285,167 | Montgomery | June 2, 1942 |
| 2,571,338 | Calabrese | Oct. 16, 1951 |
| 2,765,685 | Stratman | Oct. 9, 1956 |
| 2,774,130 | Folkenroth | Dec. 18, 1956 |